(12) United States Patent
Tamura et al.

(10) Patent No.: US 10,113,124 B2
(45) Date of Patent: Oct. 30, 2018

(54) CONTROL UNIT FOR GASIFICATION POWER GENERATION PLANT, GASIFICATION POWER GENERATION PLANT, AND CONTROL METHOD FOR GASIFICATION POWER GENERATION PLANT

(71) Applicant: MITSUBISHI HITACHI POWER SYSTEMS, LTD., Kanagawa (JP)

(72) Inventors: Ken Tamura, Tokyo (JP); Takashi Fujii, Tokyo (JP); Takanori Tsutsumi, Tokyo (JP); Takashi Kijima, Niigata (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 394 days.

(21) Appl. No.: 14/786,795

(22) PCT Filed: Apr. 24, 2014

(86) PCT No.: PCT/JP2014/061632
§ 371 (c)(1),
(2) Date: Oct. 23, 2015

(87) PCT Pub. No.: WO2014/175404
PCT Pub. Date: Oct. 30, 2014

(65) Prior Publication Data
US 2016/0169103 A1    Jun. 16, 2016

(30) Foreign Application Priority Data
Apr. 26, 2013  (JP) ................................. 2013-094272

(51) Int. Cl.
*C10J 3/72*   (2006.01)
*C10J 3/46*   (2006.01)
(Continued)

(52) U.S. Cl.
CPC ................. *C10J 3/723* (2013.01); *C10J 3/46* (2013.01); *F01K 13/02* (2013.01); *F01K 23/101* (2013.01);
(Continued)

(58) Field of Classification Search
CPC ..... F02C 6/08; F02C 6/10; C10J 3/723; C10J 3/46
See application file for complete search history.

(56) References Cited

U.S. PATENT DOCUMENTS

| 2007/0199330 | A1  | 8/2007  | West et al. |
| 2008/0141647 | A1* | 6/2008  | Yoshida .................... F02C 3/28 60/39.12 |
| 2009/0277089 | A1* | 11/2009 | Neathery .................. C10J 3/00 48/76 |

FOREIGN PATENT DOCUMENTS

| CN | 101029598 | 9/2007 |
| JP | 11-117711 | 4/1999 |

(Continued)

OTHER PUBLICATIONS

Office Action dated Jun. 1, 2016 in Chinese patent application No. 201480021544.4 (with English translation).
(Continued)

*Primary Examiner* — Jelani A Smith
*Assistant Examiner* — Donald J Wallace
(74) *Attorney, Agent, or Firm* — Wenderoth, Lind & Ponack, L.L.P.

(57) ABSTRACT

An IGCC plant includes a coal gasifier that gasifies coal by using an oxidizer, a gas turbine that is driven by combustion gas generated by combustion of fuel gas obtained by purifying gas generated by the coal gasifier in gas clean-up equipment, and an oxidizer supply path for supplying air extracted from an air compressor of the gas turbine or oxygen separated from the air as an oxidizer for the coal (Continued)

gasifier. A control unit (50) for the gasification power generation plant controls the amount of the oxidizer that is supplied to the coal gasifier to be less than or equal to a predetermined upper-limit value, while allowing deviation of an air ratio from a predetermined set value, the air ratio representing the ratio of the amount of air that is supplied to the coal gasifier relative to a theoretical amount of air for combustion of carbon, in accordance with variations in an operating-state quantity of the coal gasifier or variations in a load of the IGCC plant. Accordingly, the capacity of the oxidizer supplying equipment need not be increased in the IGCC plant, and it is possible to quickly stabilize control of the plant as a whole.

10 Claims, 11 Drawing Sheets

(51) Int. Cl.
*F02C 3/28* (2006.01)
*F02C 6/10* (2006.01)
*F02C 6/18* (2006.01)
*F01K 13/02* (2006.01)
*F01K 23/10* (2006.01)
*F02C 6/08* (2006.01)
*F02C 9/18* (2006.01)
*C10J 3/48* (2006.01)

(52) U.S. Cl.
CPC .............. *F02C 3/28* (2013.01); *F02C 6/08* (2013.01); *F02C 6/10* (2013.01); *F02C 6/18* (2013.01); *F02C 9/18* (2013.01); *C10J 3/485* (2013.01); *C10J 2300/0956* (2013.01); *C10J 2300/165* (2013.01); *C10J 2300/1678* (2013.01); *F05D 2220/32* (2013.01); *F05D 2270/05* (2013.01); *Y02E 20/16* (2013.01); *Y02E 20/18* (2013.01)

(56) References Cited

FOREIGN PATENT DOCUMENTS

| JP | 11117711 A | * | 4/1999 | ........... F01K 23/068 |
|----|------------|---|--------|------------------------|
| JP | 11-311129  |   | 11/1999 | |
| JP | 2000-120403 |  | 4/2000 | |
| JP | 2000-303804 |  | 10/2000 | |
| JP | 2003-148172 |  | 5/2003 | |
| JP | 2003148172 A | * | 5/2003 | |
| JP | 2003-336081 |  | 11/2003 | |
| JP | 2007-231949 |  | 9/2007 | |
| JP | 2010-285564 |  | 12/2010 | |
| JP | 2010285564 A | * | 12/2010 | |

OTHER PUBLICATIONS

International Search Report dated Jul. 1, 2014 in International Application No. PCT/JP2014/061632.
Written Opinion of the International Searching Authority dated Jul. 1, 2014 in International Application No. PCT/JP2014/061632.

* cited by examiner

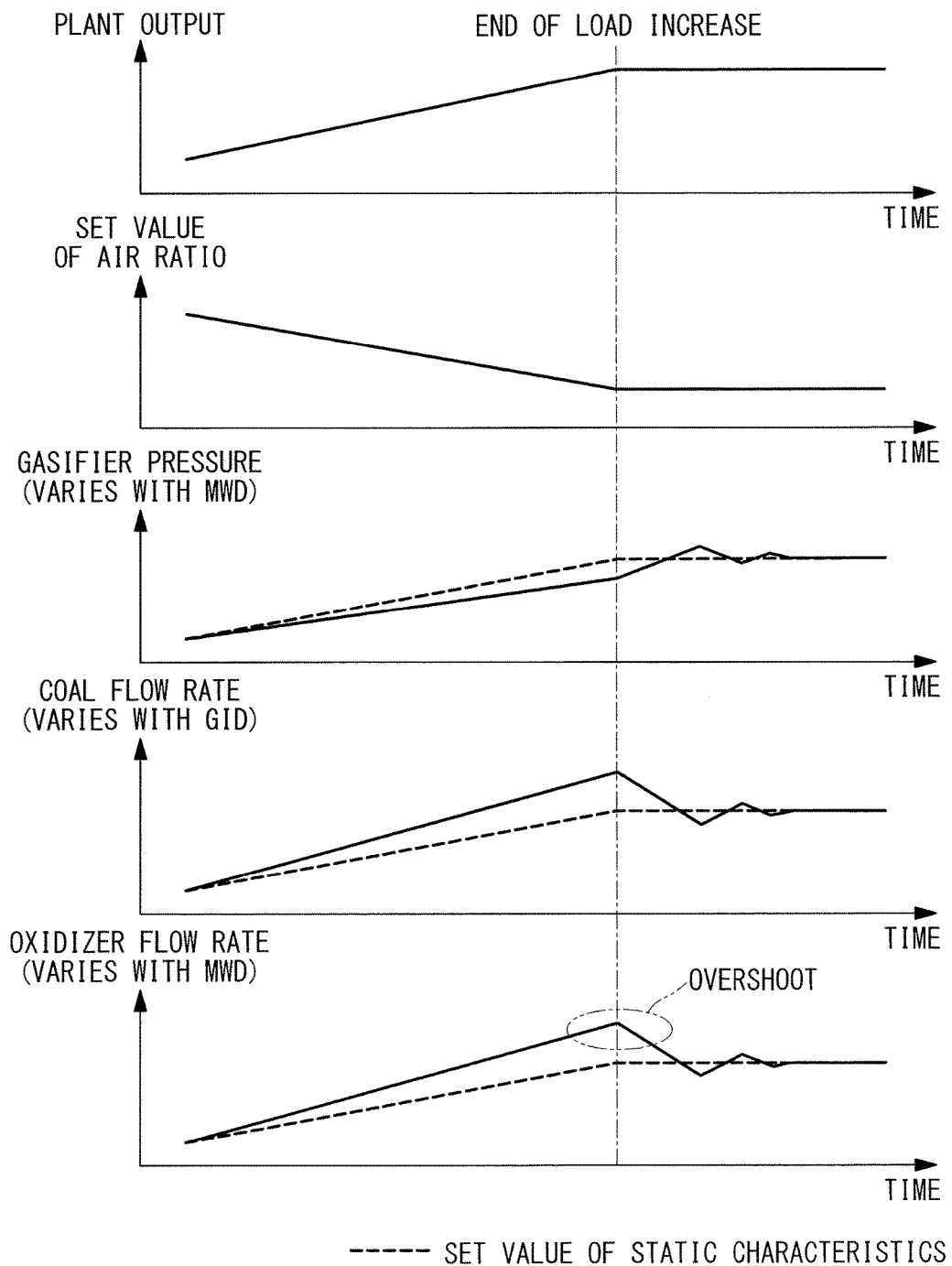

CONTROL UNIT FOR GASIFICATION POWER GENERATION PLANT, GASIFICATION POWER GENERATION PLANT, AND CONTROL METHOD FOR GASIFICATION POWER GENERATION PLANT

TECHNICAL FIELD

The present invention relates to a control unit for a gasification power generation plant, a gasification power generation plant, and a control method for a gasification power generation plant.

BACKGROUND ART

In the related art, for example, in order to improve the power generation efficiency of coal-fired plants, integrated gasification combined cycle (IGCC) plants have been developed and introduced into practical use. An IGCC plant generates synthesis gas by gasifying carbon-containing fuel such as coal by means of a gasifier. The IGCC plant includes a gas turbine that is driven by using combustible gas obtained by refining synthesis gas, which is obtained by gasifying coal by the gasifire, by gas clean-up equipment as a fuel, and also includes a steam turbine that is driven by steam obtained by heat recovery from the gas turbine exhaust gas.

In the IGCC plant, during normal operation or when the load varies, the air ratio is controlled to become a predetermined set value for each load. The air ratio is the ratio of the amount of air that is supplied to the gasifier relative to the theoretical amount of air for combustion of coal. The flow rate of air or oxygen that is supplied to the gasifier as an oxidizer is controlled based on a gasifier input demand (GID), which is a parameter dictating heat input to the gasifier, as shown in FIG. 9.

The flow rate of coal that is supplied to the gasifier is controlled by using a set value based on the GID or a preceding signal on the occasion of a load variation.

The pressure of the gasifier (gasifier pressure) is controlled by using a set value based on a megawatt demand (MWD) of the IGCC plant, as shown in FIG. 10. In the case where a deviation from the set value occurs in the gasifier pressure, the gasifier pressure is controlled by increasing or decreasing the GID so as to match a set pressure value based on the MWD. As the load of the IGCC plant becomes larger, the gasifier pressure is set to be higher, and the pressure of the fuel that is supplied to the gas turbine increases.

In particular, in the case where the type of control described above is exercised in an IGCC plant in which a portion of air at the outlet of an air compressor of the gas turbine is extracted and is used as an oxidizer for the gasifier, there are cases where an operating-state quantity of the gasifier varies since the coal quality is not uniform while the MWD is constant, which results in a temporary reduction in the heating value of the synthesis gas.

Also, in the case where the type of control described above is exercised in an IGCC plant in which char that has been collected by dust removal equipment provided downstream of the gasifier is returned to and recycled in a char burner of the gasifier, there are cases where an operating-state quantity of the gasifier varies due to clogging of a char recycle system, etc. while the MWD is constant, which results in a temporary reduction in the heating value of the synthesis gas.

In such cases, the following event (hereinafter referred to as a "fuel-consumption increase event") occurs in the IGCC plant.

Specifically, a reduction in the heating value of the synthesis gas causes an increase in fuel consumption to compensate for fuel heat input to the gas turbine. The increase in the fuel consumption of the gas turbine transiently causes a reduction in the gas pressure on the upstream side, causing a reduction in the gasifier pressure. In the case where a deviation occurs such that a measured value is less than the set pressure value of the gasifier, the GID is increased to increase a amount of introduction of coal and oxidizer.

In the IGCC plant in which a portion of air at the outlet of the air compressor of the gas turbine is extracted and is used as an oxidizer for the gasifier, an increase in the oxidizer flow rate causes an increase in the flow rate of air extracted from the gas turbine. The increase in the flow rate of the extracted air results in a reduction in the output of the gas turbine since air that serves as an operating medium of the gas turbine is transiently allocated by extracted air. The reduction in the output of the gas turbine causes the MWD to drop below the set value, and the fuel consumption of the gas turbine increases so as to compensate for the reduction.

As described above about the fuel-consumption increase event, mainly due to variations in the heating value of the synthesis gas, hunting occurs in the power generation output of the IGCC plant. Then, finally, as heat input to the gasifier increases, the amount of steam generated by a syn gas cooler (SGC) connected downstream of the gasifier increases, so that the output of the steam turbine increases. As a result, a command for decreasing the output of the gas turbine is issued, whereby the IGCC plant is stabilized.

FIG. 11 is a diagram showing temporal changes in various state quantities in the above fuel-consumption increase event. As shown in FIG. 11, in the case where a transient operating state occurs such that the heating value of the synthesis gas decreases, the gas turbine needs a greater amount of fuel gas in order to satisfy the MWD, so that the gasifier pressure begins to decrease (Refer to GT in in FIG. 11). The reduction in the gasifier pressure causes an increase in the flow rate of the coal that is supplied to the gasifier based on the GID. Then, the flow rate of the oxidizer (the flow rate of the air) that is supplied into the gasifier increases, together with an increase in the coal flow rate, so as to maintain an operating state in which coal ash is discharged in the form of molten slag and to maintain the air ratio, which represents the operating state most straightforwardly, to a predetermined set value for the purpose of stable operation of the gasifier. That is, the flow rate of air that is extracted from the air compressor to the gasifier increases.

Because of this change in the state quantity, there are cases where an overshoot occurs in the oxidizer flow rate in the process of stabilizing control. Thus, it is necessary to take into consideration an increase in the capacity corresponding to the overshoot (overshoot tolerance) regarding the capacity of oxidizer supply equipment (e.g., an air booster provided between the air compressor of the gas turbine and the gasifier). Furthermore, in the case where the above fuel-consumption increase event occurs, there are cases where it takes time to stabilize control of the IGCC plant as a whole due to the occurrence of an overshoot.

The increase in the capacity of the supply equipment due to the overshoot tolerance of the oxidizer results in increased device costs. Furthermore, as the disparity between the operating point during normal operation and the equipment design point considering the overshoot tolerance becomes greater, the motive power of the compressor during normal operation deviates from an optimal value (minimum value), so that an extra motive power is required.

Furthermore, when the load of the IGCC plant increases, as the fuel consumption of the gas turbine increases transiently, the pressure of the fuel gas system from the gasifier to the inlet of the gas turbine decreases. Furthermore, as the load of the IGCC plant increases, the set value of the gasifier pressure also increases, so that the pressure deviation of the fuel gas system tends to increase. Therefore, in order to reduce the deviation of the pressure of the fuel gas system from the set gasifier pressure, coal and oxidizer are supplied to the gasifier in advance according to a preceding signal, as shown in FIG. 12.

Also in this case, the above fuel-consumption increase event occurs due to the increase in the oxidizer flow rate, so that it takes time to stabilize control of the IGCC plant as a whole. Furthermore, it is also necessary to consider an overshoot tolerance, based on the preceding signal, about the capacity of oxidizer supplying equipment.

Here, Patent Literature 1 discloses a coal gasifier that maintains the heating value of the synthesis gas substantially constant by maintaining the amount of air supply serving as an oxidizer substantially constant while adjusting the amount of coal supply in the case where the heating value of the synthesis gas varies.

CITATION LIST

Patent Literature

{PTL 1}
Japanese Unexamined Patent Application, Publication No. 2010-285564

SUMMARY OF INVENTION

Technical Problem

With the gasifier disclosed in Patent Literature 1, although the operating point of a compressor of the air (oxidizer) supply is maintained even when the heating value of the synthesis gas varies, it presumably takes time to stabilize control of the IGCC plant as a whole due to the occurrence of an overshoot in the amount of coal supply, etc.

The present invention has been made in view of the situation described above, and it is an object thereof to provide a control unit for a gasification power generation plant, a gasification power generation plant, and a control method for a gasification power generation plant with which the capacity of oxidizer supplying equipment is not increased and with which it is possible to quickly stabilize control of a plant as a whole.

Solution to Problem

In order to achieve the above object, a control unit for a gasification power generation plant, a gasification power generation plant, and a control method for a gasification power generation plant according to the present invention employ the following solutions.

A control unit for a gasification power generation plant according to a first aspect of the present invention is a control unit for a gasification power generation plant including a gasifier that gasifies carbon-containing fuel by using an oxidizer, a gas turbine that is driven by combustion gas generated by combustion of fuel gas obtained by purifying synthesis gas from the gasifier in gas clean-up equipment, and an oxidizer supply path for supplying air extracted from an air compressor of the gas turbine or oxygen separated from the air as an oxidizer for the gasifier, the control unit for the gasification power generation plant including a switching unit for choosing a fixed-air-ratio mode, in which an air ratio representing the ratio of the amount of the oxidizer that is supplied to the gasifier relative to a theoretical amount of the oxidizer for combustion of the carbon-containing fuel is fixed, in a case where the gasification power generation plant is in a stable state, whereas choosing a variable-air-ratio mode, in which the air ratio is variable, in a case where an operating-state quantity of the gasifier has varied or in a case where a load of the gasification power generation plant has varied.

According to the present invention, the gasification power generation plant includes a gasifier that gasifies carbon-containing fuel by using an oxidizer, a gas turbine that is driven by combustion gas generated by combustion of fuel gas obtained by purifying synthesis gas from the gasifier in gas clean-up equipment, and an oxidizer supply path for supplying air extracted from an air compressor of the gas turbine or oxygen separated from the air as an oxidizer for the gasifier. For example, the carbon-containing fuel is coal.

Even in the case where the operating-state quantity of the gasifier varies or in the case where the load of the gasification power generation plant varies, in the related art, it has been the case to exercise control in the fixed-air-ratio mode, in which the air ratio is fixed, just like the case where the gasification power generation plant is in a stable state. However, due to the fixed air ratio, there have been cases where an overshoot occurs in another control amount (e.g., the oxidizer flow rate) of the gasifier, so that it takes time to stabilize control of the gasification power generation plant as a whole. The operating-state quantity of the gasifier is, for example, the heating value of the synthesis gas in the gasifier.

Thus, according to the present invention, in the case where the operating-state quantity of the gasifier has varied or in the case where the load of the gasification power generation plant has varied, the operation mode is switched from the fixed-air-ratio mode to the variable-air-ratio mode, in which the air ratio is variable.

In the case where the operating-state quantity of the gasifier has varied or the case where the load of the gasification power generation plant has varied, the operation mode is switched to the variable-air-ratio mode, so that the oxidizer amount varies in accordance with the load, whereby overshooting of the oxidizer amount is suppressed. Furthermore, since overshooting of the oxidizer amount is suppressed, the oxidizer amount relative to the amount of carbon-containing fuel that is supplied to the gasifier decreases. Thus, the amount of generated combustible gas (e.g., CO) in the gas generated in the gasifier increases. Accordingly, the amount of heating value generated by the synthesis gas increases more rapidly compared with the related art, so that the gasification power generation plant is stabilized in a shorter time.

Furthermore, since overshooting of the oxidizer amount is suppressed, overshoot tolerance that is allowed in relation to the capacity of the oxidizer supplying equipment becomes smaller, so that the capacity of the supplying equipment can be made smaller compared with the related art. Furthermore, as the overshoot tolerance decreases, the deviation of the equipment design point from the operating point for normal operation of the supplying equipment is suppressed.

Accordingly, with this configuration, the capacity of the oxidizer supplying equipment need not be increased, and it is possible to quickly stabilize control of the plant as a whole.

In the first aspect, preferably, the case where the operating-state quantity of the gasifier varies is a case where the deviation of a measured value of the pressure of the gasifier from a set value of the pressure of the gasifier becomes greater compared with that in the stable state.

With this configuration, it is possible to simply determine whether the operating-state quantity of the gasifier has varied.

In the first aspect, preferably, the gasification power generation plant includes a steam turbine that is driven by steam generated by heat recovery from the gasifier and the gas turbine exhaust gas and that does not share a drive shaft with the gas turbine, and the case where the operating-state quantity of the gasifier varies is a case where the output of the gas turbine does not increase, whereas a gasifier input demand increases, the gasifier input demand being a parameter dictating heat input to the gasifier.

With this configuration, it is possible to simply determine whether the operating-state quantity of the gasifier has varied.

A control unit for a gasification power generation plant according to a second aspect of the present invention is a control unit for a gasification power generation plant including a gasifier that gasifies carbon-containing fuel by using an oxidizer, a gas turbine that is driven by combustion gas generated by combustion of fuel gas obtained by purifying synthesis gas from the gasifier in gas clean-up equipment, and an oxidizer supply path for supplying air extracted from an air compressor of the gas turbine or oxygen separated from the air as an oxidizer for the gasifier, the control unit for the gasification power generation plant including an oxidizer-amount controlling unit for controlling the amount of the oxidizer that is supplied to the gasifier to be less than or equal to a predetermined upper-limit value, while allowing deviation of an air ratio from a predetermined set value, the air ratio representing the ratio of the amount of the oxidizer that is supplied to the gasifier relative to a theoretical amount of the oxidizer for combustion of the carbon-containing fuel, in accordance with variations in an operating-state quantity of the gasifier or variations in a load of the gasification power generation plant.

According to the present invention, the gasification power generation plant includes a gasifier that gasifies carbon-containing fuel by using an oxidizer, a gas turbine that is driven by combustion gas generated by combustion of fuel gas obtained by purifying synthesis gas from the gasifier in gas clean-up equipment, and an oxidizer supply path for supplying air extracted from an air compressor of the gas turbine or oxygen separated from the air as an oxidizer for the gasifier. For example, the oxidizer is air or oxygen, and the carbon-containing fuel is coal.

Even in the case where the operating-state quantity of the gasifier varies or in the case where the load of the gasification power generation plant varies, in the related art, it has been the case to exercise control so as to maintain the air ratio (the ratio of the amount of the oxidizer that is supplied to the gasifier relative to the theoretical amount of the oxidizer for combustion of carbon-containing fuel to the gasifier) at a predetermined set value in order to constantly maintain the operating state of the gasifier. However, due to the fixed air ratio, there have been cases where an overshoot occurs in another control amount (e.g., the oxidizer flow rate) of the gasifier, so that it takes time to stabilize control of the gasification power generation plant as a whole. The operating-state quantity of the gasifier is, for example, the heating value of the synthesis gas in the gasifier.

Thus, according to the present invention, the oxidizer-amount controlling unit controls the amount of the oxidizer that is supplied to the gasifier to be less than or equal to a predetermined upper-limit value while allowing transient variations in the operating state of the gasifier, i.e., while allowing deviation of the air ratio from a predetermined set value, in accordance with variations in the operating-state quantity of the gasifier or variations in the load of the gasification power generation plant, and supplies the oxidizer to the gasifier. The upper-limit value is based on the amount of air flow that the air compressor can supply to the gasifier. Specifically, the upper-limit value is a value having tolerance with respect to the maximum air flow of the air compressor. Furthermore, for example, the allowable range of deviation from the predetermined set value is 3%, or preferably 5%, in terms of the relative ratio to the set value.

By intentionally setting an upper-limit value for the control amount of the amount of the oxidizer that is supplied to the gasifier, overshooting of the oxidizer amount is suppressed. Furthermore, by setting the upper-limit value, the oxidizer amount relative to the amount of the carbon-containing fuel that is supplied to the gasifier decreases. Thus, the amount of generated combustible gas (e.g., CO) in the synthesis gas in the gasifier increases. Accordingly, the heating value of synthesis gas increases more rapidly compared with the related art, so that the gasification power generation plant is stabilized in a shorter time.

Furthermore, since overshooting of the oxidizer amount is suppressed due to the set upper-limit value, overshoot tolerance that is allowed in relation to the capacity of the oxidizer supplying equipment becomes smaller, so that the capacity of the supplying equipment can be made smaller compared with the related art. Furthermore, as the overshoot tolerance decreases, the deviation of the equipment design point from the operating point for normal operation of the supplying equipment is suppressed.

As described above, according to the present invention, an upper-limit value is set for the amount of oxidizer that is supplied to the gasifier, while allowing deviation of the air ratio from a predetermined set value. Thus, the capacity of the oxidizer supplying equipment need not be increased, and it is possible to quickly stabilize control of the plant as a whole.

In the second aspect, preferably, the oxidizer amount is determined based on the deviation of a measured value of the pressure of the gasifier from a set value of the pressure of the gasifier based on an output demand value to the gasification power generation plant.

The gasifier pressure serves as an important parameter for controlling the flow rate in the case where fuel gas obtained by purifying gas generated in the gasifier in the gas clean-up equipment to the gas turbine. For example, if the gasifier pressure is too low, there is a possibility of failing to supply an amount of fuel gas needed by the gas turbine. Thus, according to the present invention, the oxidizer amount is determined based on the deviation of a measured value of the gasifier pressure from a set value of the gasifier pressure based on an output demand value, so that an oxidizer amount that is suitable for the operation of the gasification power generation plant is determined.

In the second aspect, preferably, the oxidizer amount determined based on the output demand value is corrected by using a gasifier input demand, which is a parameter dictating heat input to the gasifier.

The output demand value to the gasification power generation plant does not actually change considerably, so that it can hardly be said that the demand value reflects the state of the gasifier. Therefore, according to the present invention, the oxidizer flow rate that is determined based on the output demand value is corrected by using a gasifier input demand value. Thus, a more suitably oxidizer amount is determined.

In the second aspect, preferably, the oxidizer-amount controlling unit controls the oxidizer amount to be less than or equal to the upper-limit value only in a case where the pressure of the gasifier is increased.

According to the present invention, in the case where the gasifier pressure is increased, an upper-limit value is set for the oxidizer amount, and the oxidizer amount is controlled to be less than or equal to the upper-limit value. On the other hand, in the case where the gasifier pressure is decreased, a limit value is not set on the lower-limit side of the oxidizer amount. This is because if a limit value is set on the lower-limit side of the control amount of the oxidizer amount in the case where the gasifier pressure is decreased, there is a risk that the air ratio may become excessively high, so that gas with sufficient heating value is not generated in the gasifier, which results in accidental stop of the gas turbine.

A gasification power generation plant according to a third aspect of the present invention includes a gasifier that gasifies carbon-containing fuel by using an oxidizer, a gas turbine that is driven by combustion gas generated by combustion of fuel gas obtained by purifying synthesis gas from the gasifier in gas clean-up equipment, and the control unit described above.

A control method for a gasification power generation plant according to a fourth aspect of the present invention is a control method for a gasification power generation plant including a gasifier that gasifies carbon-containing fuel by using an oxidizer, a gas turbine that is driven by combustion gas generated by combustion of fuel gas obtained by purifying synthesis gas from the gasifier in gas clean-up equipment, and an oxidizer supply path for supplying air extracted from an air compressor of the gas turbine or oxygen separated from the air as an oxidizer for the gasifier, wherein a fixed-air-ratio mode, in which an air ratio representing the ratio of the amount of the oxidizer that is supplied to the gasifier relative to a theoretical amount of the oxidizer for combustion of the carbon-containing fuel is fixed, is chosen in a case where the gasification power generation plant is in a stable state, whereas a variable-air-ratio mode, in which the air ratio is variable, is chosen in a case where an operating-state quantity of the gasifier has varied or in a case where a load of the gasification power generation plant has varied.

A control method for a gasification power generation plant according to a fifth aspect of the present invention is a control method for a gasification power generation plant including a gasifier that gasifies carbon-containing fuel by using an oxidizer, a gas turbine that is driven by combustion gas generated by combustion of fuel gas obtained by purifying synthesis gas from the gasifier in gas clean-up equipment, and an oxidizer supply path for supplying air extracted from an air compressor of the gas turbine or oxygen separated from the air as an oxidizer for the gasifier, wherein the amount of the oxidizer that is supplied to the gasifier is controlled to be less than or equal to a predetermined upper-limit value, while allowing deviation of an air ratio from a predetermined set value, the air ratio representing the ratio of the amount of the oxidizer that is supplied to the gasifier relative to a theoretical amount of the oxidizer for combustion of the carbon-containing fuel, in accordance with variations in an operating-state quantity of the gasifier or variations in a load of the gasification power generation plant.

Advantageous Effects of Invention

According to the present invention, a superior advantage is afforded in that the capacity of oxidizer supply equipment need not be increased and in that it is possible to quickly stabilize control of a plant as a whole.

BRIEF DESCRIPTION OF DRAWINGS

FIG. 12 is a graph showing temporal changes in various state quantities in a case where a load of an IGCC plant has varied in the related art.

DESCRIPTION OF EMBODIMENTS

The following describes an embodiment of a control unit for a gasification power generation plant, a gasification power generation plant, and a method of controlling a gasification power generation plant according to the present invention with reference to the drawings.

First Embodiment

Now, a first embodiment of the present invention will be described.

The first embodiment will be described in the context of a case where the present invention is applied to an integrated gasification combined cycle plant (hereinafter referred to as an "IGCC plant") including a coal gasifier that gasifies carbon-containing fuel by using an oxidizer, a gas turbine that is driven by combustion gas obtained by combustion of fuel gas obtained by purifying the gas generated by the coal gasifier via gas clean-up equipment, and a steam turbine that is driven by steam generated by heat recovery from the gasifier and the gas turbine. An example of the oxidizer is air and oxygen, and an example of the carbon-containing fuel is coal.

Figure 1:
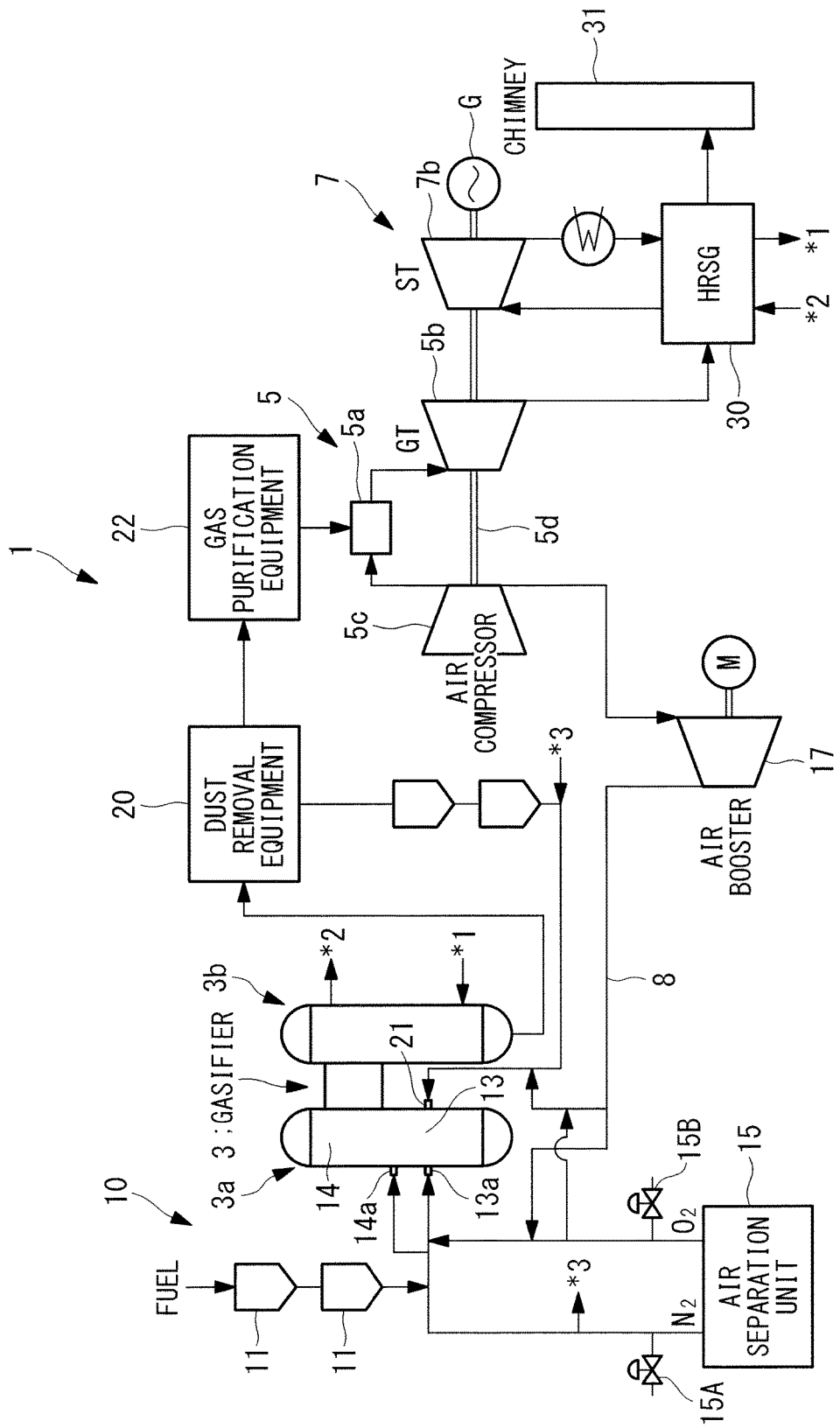
FIG. 1 is a diagram showing the configuration of an IGCC plant according to a first embodiment of the present invention.

FIG. 1 is a diagram schematically showing the overall configuration of an IGCC plant 1 according to the first embodiment.

As shown in FIG. 1, the IGCC plant 1 according to the first embodiment includes a coal gasifier 3, gas turbine equipment 5, steam turbine equipment 7, and a heat recovery steam generator (hereinafter referred to as an "HRSG") 30 as main components thereof.

On the upstream side of the coal gasifier 3, coal supplying equipment 10 that supplies pulverized coal to the coal gasifier 3 is provided. The coal supplying equipment 10 includes a crusher (not shown) that crushes raw coal into pulverized coal on the order of micrometers to hundreds of micrometers, and the pulverized coal crushed by the crusher is stored in multiple hoppers 11.

The pulverized coal stored in the individual hoppers 11 is transported to the coal gasifier 3 at a constant flow rate together with nitrogen gas supplied from an air separation unit (hereinafter referred to as an "ASU"). The ASU 15 is a unit that separates nitrogen gas and oxygen gas from air and then supplies the nitrogen gas and oxygen gas to the coal gasifier 3. In order to release nitrogen gas and oxygen gas generated in excess to the outside, valves 15A and 15B are provided on supply lines to the coal gasifier 3.

The coal gasifier 3 includes a gasification portion 3a that is formed such that gas flows from the lower side to the upper side and a heat exchange unit 3b.

The gasification portion 3a includes a combustor 13 and a reductor 14, provided in that order from the lower side. The combustor 13 is a unit that combusts portions of pulverized coal and char and thermally decomposes and discharges the remaining portions as volatile matter (CO and $H_2$, low hydrocarbon). An entrained bed is adopted in the combustor 13. However, the combustor 13 may adopt a fluidized bed or a fixed bed.

The combustor 13 and the reductor 14 include a combustor burner 13a and a reductor burner 14a, respectively, and pulverized coal is supplied from the coal supplying equipment 10 to the combustor burner 13a and the reductor burner 14a.

The combustor burner 13a receives, as an oxidizer, air extracted from an air compressor 5c of the gas turbine equipment 5 via an air booster 17 and an oxidizer supply path 8, together with the oxygen gas separated by the ASU 15. Thus, the combustor burner 13a receives air in which the oxygen concentration has been adjusted. Alternatively, the ASU 15 may separate oxygen from the air extracted from the air compressor 5c, and the separated oxygen may be supplied to the combustor burner 13a via the oxidizer supply path 8.

The reductor 14 gasifies pulverized coal by using high-temperature combustion gas from the combustor 13. Thus, combustible gas that serves as gas fuel, such as CO and $H_2$, is generated from coal. The coal gasification reaction is an endothermic reaction in which carbon in the pulverized coal and char reacts with $CO_2$ and $H_2O$ in the high-temperature gas to generate CO and $H_2$.

The coal gasifier 3 causes the air supplied from the air compressor 5c to react with coal, thereby generating gas. Specifically, the heat exchange unit 3b of the coal gasifier 3 includes multiple heat exchangers (not shown), and the heat exchangers are configured to acquire sensible heat from the synthesis gas supplied from the reductor 14 to generate steam. The steam generated by the heat exchangers is mainly used as steam for driving a steam turbine 7b. The synthesis gas that has been passed through the heat exchange unit 3b is supplied to dust removal equipment 20. The dust removal equipment 20 includes a porous filter, and the synthesis gas is passed through the porous filter to capture and collect char containing uncombusted components coexisting in the synthesis gas. The captured char is deposited on the porous filter to form a char layer. Na and K components contained in the synthesis gas are condensed in the char layer, whereby the Na and K components are also removed in the dust removal equipment 20.

The char collected in this way is returned to a char burner 21 of the coal gasifier 3 and is recycled. The Na and K components returned to the char burner 21 together with the char are discharged in the end from the lower side of the gasification portion 3a together with dissolved ash of pulverized coal. The dissolved and discharged ash is rapidly cooled with water and is crushed to become glass-like slag.

The synthesis gas that has been passed through the dust removal equipment 20 is purified by gas clean-up equipment 22, and the purified gas is supplied to a combustor 5a of the gas turbine equipment 5 as fuel gas.

The gas turbine equipment 5 includes the combustor 5a that combusts the fuel gas obtained by purifying the synthesis gas in the gas clean-up equipment 22, a gas turbine 5b that is driven by the combustion gas, and the air compressor 5c that supplies high-pressure air to the combustor 5a. The gas turbine 5b and the air compressor 5c are connected to each other via the same rotary shaft 5d. The air compressed in the air compressor 5c is extracted and is also supplied to the air booster 17 separately from the combustor 5a.

The combustion flue gas that has been passed through the gas turbine 5b is supplied to the HRSG 30.

The steam turbine 7b of the steam turbine equipment 7 is connected to the same rotary shaft 5d as the gas turbine equipment 5, constituting what is called a single-shaft combined system. The steam turbine 7b receives high-pressure steam from the coal gasifier 3 and the HRSG 30. The steam turbine 7b is not limited to a single-shaft combined system and may constitute a two-shaft combined system.

A generator G that outputs electricity from the rotary shaft 5d driven by the gas turbine 5b and the steam turbine 7b is disposed on the opposite side of the gas turbine equipment 5 from the steam turbine equipment 7. The position at which the generator G is disposed is not limited to this position and may be any position as long as it is possible to output electricity from the rotary shaft 5d.

The HRSG 30 generates steam by using the combustion flue gas from the gas turbine 5b and discharges the combustion flue gas from a chimney 31 into the air.

Next, the operation of the IGCC plant 1 to which the coal gasifier 3 configured as described above is applied will be described.

Raw coal is crushed by a crusher (not shown), and the crushed coal is supplied to and stored in the hoppers 11. The pulverized coal stored in the hoppers 11 is supplied to the reductor burner 14a and the combustor burner 13a together with nitrogen gas separated in the ASU 15. Furthermore, char collected in the dust removal equipment 20 is supplied to the char burner 21.

As combustion gas for the combustor burner 13a, air that has been extracted from the air compressor 5c of the gas turbine equipment 5 and whose pressure has then been boosted by the air booster 17, together with oxygen gas separated by the air separation unit 15, is used. The combustor 13 partially combusts pulverized coal and char by using combustion air and thermally decomposes the remaining portions into volatile matter (CO and $H_2$, low hydrocarbon).

In the reductor 14, the pulverized coal supplied from the reductor burner 14a and the char from which volatile matter has been discharged in the combustor 13 are gasified with high-temperature gas that has come up from the combustor 13, whereby combustible gas such as CO and $H_2$ is generated.

The synthesis gas that has been passed through the reductor 14 confers its sensible heat to the individual heat exchangers while passing through the heat exchange unit 3b of the coal gasifier 3, thereby generating steam. The steam generated in the heat exchange unit 3b is mainly used to drive the steam turbine 7b.

The synthesis gas that has been passed through the heat exchange unit 3b is supplied to the dust removal equipment 20, where char is collected. The Na and K components in the synthesis gas are condensed here and captured into char. The collected char containing the Na and K components is returned to the coal gasifier 3.

The synthesis gas that has been passed through the dust removal equipment 20 is purified in the gas clean-up equipment 22, and the purified gas is supplied to the combustor 5a of the gas turbine equipment 5, where the gas is combusted together with compressed air supplied from the air compressor 5c. The combustion gas rotates the gas turbine 5b, whereby the rotary shaft 5d is driven.

The combustion flue gas that has been passed through the gas turbine 5b is supplied to the HRSG 30, where steam is generated by using sensible heat of the combustion flue gas. The steam generated in the HRSG 30 is mainly used to drive the steam turbine 7b.

The steam turbine 7b is rotated by the steam from the coal gasifier 3 and the steam from the HRSG 30 to drive the rotary shaft 5d shared with the gas turbine equipment 5. The rotary force of the rotary shaft 5d is converted into an electricity output by the generator G.

Figure 2:
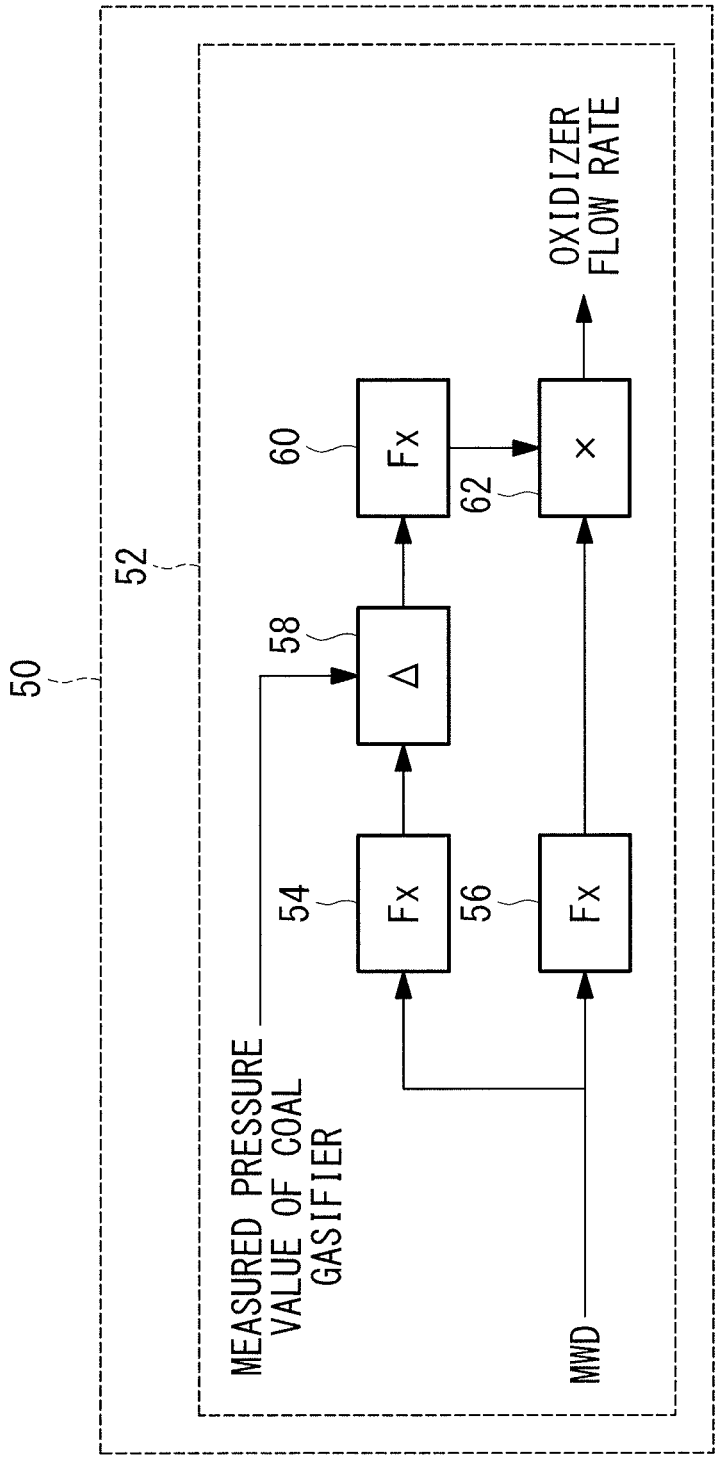
FIG. 2 is a functional block diagram regarding control of an oxidizer flow rate according to the first embodiment of the present invention.

FIG. 2 is a functional block diagram regarding control of the amount of oxidizer supplied to the coal gasifier 3 according to the first embodiment (the oxidizer flow rate in the first embodiment).

As shown in FIG. 2, a control unit 50 of the IGCC plant 1 includes an oxidizer flow rate control unit 52 that is responsible for controlling the oxidizer flow rate. For example, the control unit 50 is constituted of a CPU (Central Processing Unit), a RAM (Random Access Memory), a computer-readable recording medium, etc. Furthermore, for example, the series of processing for realizing the various functions, such as the function of the oxidizer flow rate control unit 52, is recorded on a recording medium, etc. in the form of programs, and the CPU loads the programs into the RAM, etc. and executes processing for processing and calculating information to realize the various functions.

The oxidizer flow rate control unit 52 controls the flow rate of the oxidizer that is supplied to the coal gasifier 3 to be less than or equal to a predetermined upper-limit value while allowing deviation of the air ratio (the ratio of the amount of air supplied to the coal gasifier 3 to the theoretical amount of air for coal combustion) from a predetermined set value in accordance with variations in an operating-state quantity of the coal gasifier 3 or variations in the load of the IGCC plant 1. The air ratio is set to a value at which slag is discharged.

The set value mentioned above is a set value that is considered as an ideal oxidizer flow rate for the static characteristics of the IGCC plant 1.

Furthermore, the upper-limit value is based on the amount of air flow that the air compressor 5c can supply to the coal gasifier 3. Specifically, the upper-limit value is a value having tolerance with respect to the maximum air flow of the air compressor 5c. Furthermore, for example, the allowable range of deviation from the predetermined set value is 3%, or preferably 5%, in terms of the relative ratio to the set value.

As shown in FIG. 2, the oxidizer flow rate control unit 52 includes a gasifier-pressure calculating unit 54, an oxidizer flow rate calculating unit 56, a pressure-deviation calculating unit 58, a coefficient calculating unit 60, and a coefficient multiplying unit 62.

The gasifier-pressure calculating unit 54 calculates a set value of the pressure of the coal gasifier 3 (hereinafter referred to as the "gasifier pressure") based on an output demand (a megawatt demand value, hereinafter referred to as an "MWD," in the first embodiment) to the IGCC plant 1. The gasifier-pressure calculating unit 54 calculates the set value of the gasifier pressure based on a function including the MWD as a variable, a table representing gasifier pressures corresponding to MWDs, etc.

The oxidizer flow rate calculating unit 56 calculates, based on the MWD, a set value of the flow rate of the oxidizer that is supplied to the coal gasifier 3 (hereinafter referred to as an "oxidizer flow rate set value"). The oxidizer flow rate calculating unit 56 calculates the oxidizer flow rate set value based on a function including the MWD as a variable, a table representing oxidizer flow rates corresponding to MWDs, etc.

The pressure-deviation calculating unit 58 subtracts the gasifier-pressure set value calculated by the gasifier-pressure calculating unit 54 from a gasifier-pressure measured value to calculate a deviation (hereinafter referred to as a "pressure deviation").

The coefficient calculating unit 60 calculates, based on the pressure deviation calculated by the pressure-deviation calculating unit 58, a coefficient $\alpha$ for multiplying by the oxidizer flow rate set value calculated by the oxidizer flow rate calculating unit 56. The coefficient $\alpha$ is a coefficient that makes the air ratio a predetermined set value. The coefficient calculating unit 60 calculates the coefficient $\alpha$ based on a function including the coefficient $\alpha$ as a variable, a table representing oxidizer flow rates corresponding to pressure deviations, etc.

An upper-limit value is set for the coefficient $\alpha$. For example, the upper-limit value is about 5% of the oxidizer flow rate set value for normal operation (for static characteristics).

The coefficient multiplying unit 62 multiplies the oxidizer flow rate set value calculated by the oxidizer flow rate calculating unit 56 by the coefficient $\alpha$ calculated by the coefficient calculating unit 60 to calculate the flow rate of the oxidizer that is actually supplied to the coal gasifier 3. That is, the flow rate of the oxidizer that is supplied to the coal gasifier 3 is controlled to be less than or equal to the upper-limit value relative to the oxidizer flow rate set value.

Since the oxidizer flow rate control unit 52 determines the oxidizer flow rate based on an MWD to the IGCC plant 1 as described above, the output of the IGCC plant 1 is stabilized directly and simply.

Similarly to the related art, the coal flow rate is determined based on a gasifier input demand (hereinafter referred to as a "GID"), which is a parameter dictating heat input to the coal gasifier 3.

Here, the gasifier pressure serves as an important parameter for controlling the amount of fuel gas supply in the case where fuel gas is supplied to the gas turbine 5b. For example, if the gasifier pressure is too low, there is a possibility of failing to supply an amount of fuel gas needed by the gas turbine 5b.

On the other hand, as described above, the oxidizer flow rate control unit 52 determines an oxidizer flow rate based on the pressure deviation between a gasifier-pressure set value based on an MWD and a gasifier-pressure measured value, so that an oxidizer flow rate that is suitable for the operation of the IGCC plant 1 including the gas turbine 5b is determined.

Furthermore, the oxidizer flow rate that is determined based on an MWD should preferably be corrected by using a GID.

Since the MWD is a power generation output that is requested of the IGCC plant 1, large variations are not likely to occur, and therefore, the MWD can hardly be regarded as a demand value that reflects the state of the coal gasifier 3. Thus, by using a GID, which is a demand value that reflects the state of the coal gasifier 3, to correct the oxidizer flow rate determined based on the MWD (e.g., by multiplying the oxidizer flow rate determined based on the MWD by a coefficient corresponding to a variation in the GID), a more suitable oxidizer flow rate is determined, which serves to alleviate a reduction in the heating value of the synthesis gas in the coal gasifier 3.

Furthermore, the oxidizer flow rate control unit 52 controls the oxidizer flow rate to be less than or equal to the upper-limit value in the case where the gasifier pressure is boosted (in the case where the pressure deviation relative to the control set value is a negative value), whereas no limit value is set for the control amount of the oxidizer flow rate in the case where the gasifier pressure of the coal gasifier 3 is reduced.

Figure 3:
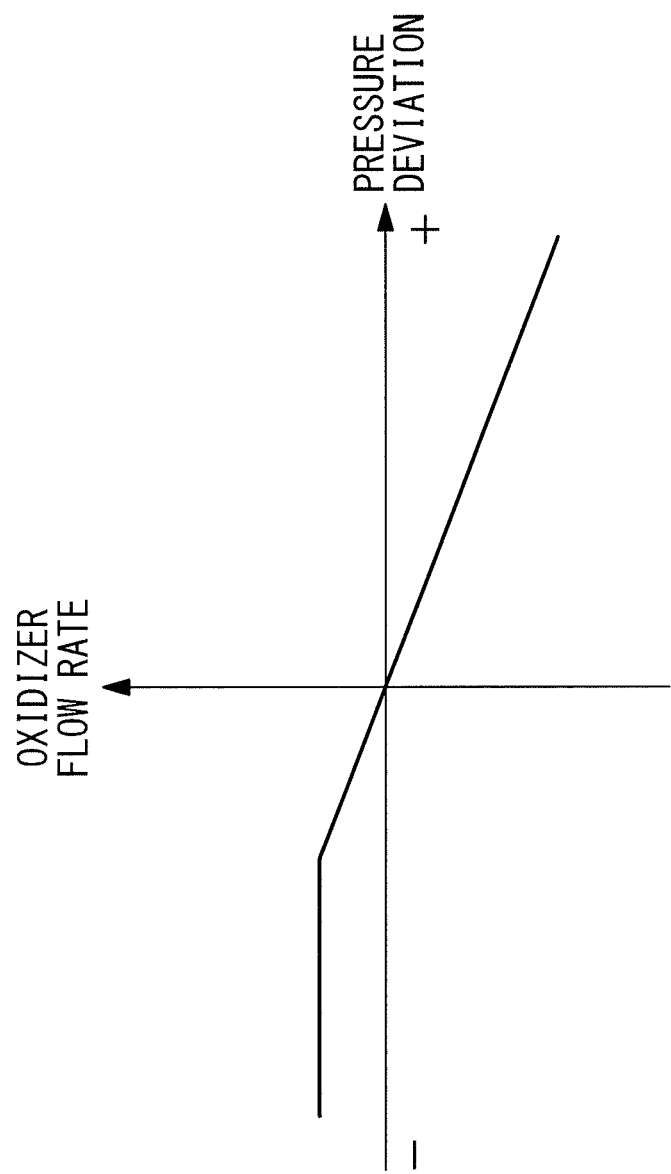
FIG. 3 is a diagram showing an example of the relationship between a pressure deviation and an oxidizer flow rate according to the first embodiment.

FIG. 3 is a diagram showing an example of the relationship between the pressure deviation and the oxidizer flow rate. In FIG. 3, a negative pressure deviation means that the gasifier-pressure measured value is less than the gasifier-pressure set value based on the MWD, whereas a positive pressure deviation means that the gasifier-pressure measured value is greater than the gasifier-pressure set value based on the MWD.

As shown in FIG. 3, in the case where the pressure deviation is negative, the oxidizer flow rate increases with the coal flow rate to be less than or equal to the upper-limit value based on the MWD. On the other hand, in the case where the pressure deviation is positive, the oxidizer flow rate decreases with the coal flow rate without any limit based on the MWD.

In the case where the pressure deviation is positive, if a limit value is provided for the control amount of the oxidizer flow rate, there is a possibility that only the coal flow rate decreases even though the oxidizer flow rate does not decrease, which might result in an excessively high air ratio. Then, the coal combustion becomes even closer to complete combustion, so that an adequate amount of combustible gas is not generated in the coal gasifier 3, which results in a risk of accidental stop of the gas turbine 5b. Thus, a limit value is not provided for the control amount of the oxidizer flow rate in the case where the pressure deviation is positive, which prevents an accidental stop of the gas turbine 5b.

Next, the control of the oxidizer flow rate according to the first embodiment will be described with reference to FIGS. 4 to 6.

Figure 4:
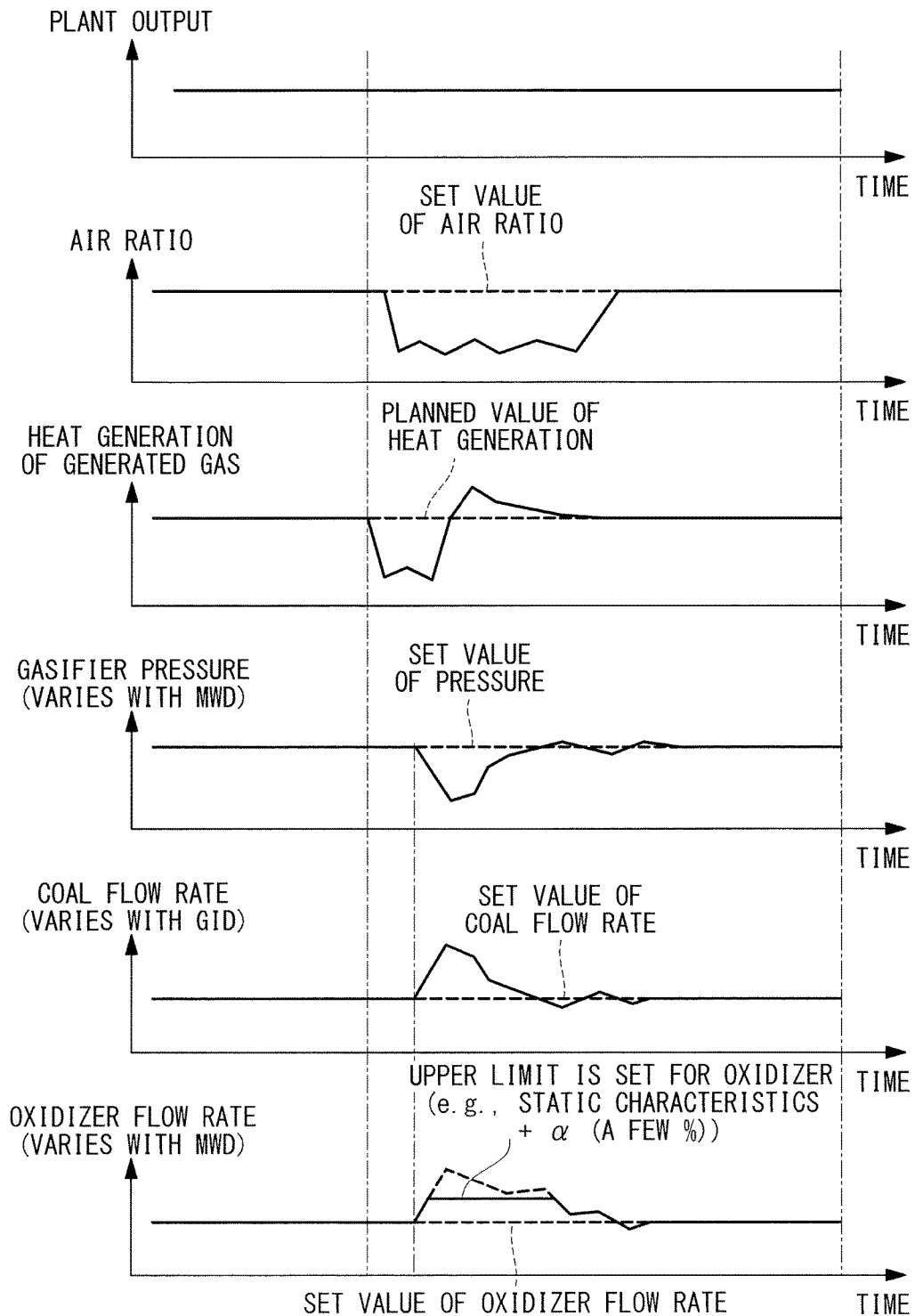
FIG. 4 is a graph showing temporal changes in various state quantities corresponding to variations in an operating-state quantity of a coal gasifier according to the first embodiment.

FIG. 4 is a graph showing temporal changes in various state quantities corresponding to variations in the operating-state quantity of the coal gasifier 3 according to the first embodiment.

As an example of a variation in the operating-state quantity of the coal gasifier 3, a case where the heating value of the synthesis gas in the coal gasifier 3 decreases, as shown in FIG. 4, will be described. In this case, the gas turbine 5b needs a greater amount of fuel gas in order to satisfy the MWD, so that the gasifier pressure begins to decrease.

Accordingly, the flow rate of the coal that is supplied to the coal gasifier 3 is increased based on the GID. Furthermore, in accordance with this increase, the oxidizer flow rate control unit 52 calculates an oxidizer flow rate based on the MWD.

Here, it has been the case with the IGCC plant of the related art to control the air ratio so as to maintain a predetermined set value. However, by maintaining a constant air ratio, there have been cases where an overshoot occurs in another control amount (e.g., the oxidizer flow rate) of the coal gasifier 3, so that it takes time to stabilize the overall control of the IGCC plant 1.

Thus, as described earlier, in the first embodiment, the oxidizer flow rate is controlled to be less than or equal to a predetermined upper-limit value while allowing deviation of the air ratio from the predetermined set value. In the graph of FIG. 4, showing variations in the oxidizer flow rate, the period in which the oxidizer flow rate increases and then remains constant without variations is a period in which the control amount of the oxidizer flow rate is limited.

Now, the air ratio in the case where the control amount of the oxidizer flow rate is limited will be described with reference to FIG. 5.

Figure 5:
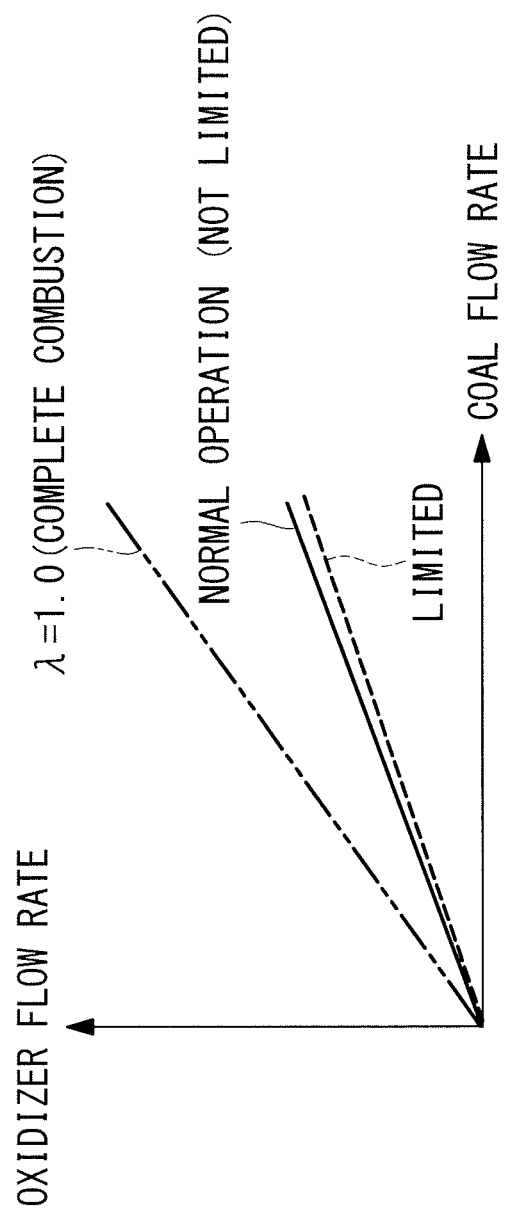
FIG. 5 is a graph showing the relationship among an oxidizer flow rate, a coal flow rate, and an air ratio A.

FIG. 5 is a graph showing the relationship among the oxidizer flow rate, the coal flow rate, and the air ratio $\lambda$.

First, in the case where the air ratio $\lambda=1.0$, the coal experiences complete combustion, so that combustible gas (e.g., CO) is not generated in the synthesis gas in the coal gasifier 3. Thus, in normal operation, the air ratio is set to a value with which combustible gas having an amount of generated heat needed for combustion in the gas turbine 5b will be generated. Furthermore, since ash components are generated as gas is generated in the coal gasifier 3, it is necessary to dissolve the ash components and discharge them in the form of slag. Thus, the air ratio is also controlled so that the temperature of the coal gasifier 3 allows dissolution of the ash components.

In the related art, it has been the case to vary the coal flow rate and the oxidizer flow rate in similar manners to constantly maintain the air ratio at an optimal value (set value) at which an adequate amount of fuel gas will be generated and ash components will be dissolved. With this control, however, it has been the case that an overshoot in the oxidizer flow rate occurs in the case where a variation occurs in the operating-state quantity of the coal gasifier 3 or in the case where a variation occurs in the load of the IGCC plant 1, so that it takes time to stabilize the IGCC plant 1.

Meanwhile, it has newly been discovered that a temporal decrease in the air ratio from the optimal value does not cause any problem in the operation of the IGCC plant 1.

Thus, in the first embodiment, as described earlier, the air ratio is allowed to deviate from a set value that is considered as being optimal, and a limit is defined for the control amount of the oxidizer flow rate. Thus, the oxidizer flow rate is made smaller relative to the flow rate of the coal that is supplied to the coal gasifier 3, whereby the air ratio is decreased compared with normal operation without any limit.

Thus, the amount of generated combustible gas in the synthesis gas in the coal gasifier 3 increases. Accordingly, the heating value of the synthesis gas increases more rapidly compared with the related art, so that the IGCC plant 1 is stabilized more quickly (in a time about 10% to 20% shorter than the related art).

Furthermore, by intentionally setting an upper-limit value for the flow rate of the oxidizer that is supplied to the coal gasifier 3, overshooting of the oxidizer flow rate is suppressed.

Since before, in the case where it is anticipated that overshooting will occur in the oxidizer flow rate, it has been necessary to consider overshoot tolerance regarding the capacity of the air booster 17, which is equipment that supplies the oxidizer (air) to the coal gasifier 3. When overshoot tolerance is taken into consideration regarding the capacity of the air booster 17, a greater disparity occurs between the operating point for normal operation and the equipment design point considering the overshoot tolerance. Therefore, the motive power for normal operation of the air booster 17 deviates from the optimal value (minimum value), so that an extra motive power is required.

On the other hand, in the first embodiment, overshoot tolerance that should be considered becomes smaller, which makes it possible to reduce the capacity of the air booster 17 compared with the related art. Furthermore, as the overshoot tolerance decreases, the deviation of the equipment design point and the operating point for normal operation of the air booster 17 is suppressed, and the extra motive force is also suppressed.

Specifically, in the related art, about 10% of the capacity of the air booster 17 is allowed as the overshoot tolerance. In the first embodiment, the overshoot tolerance can be reduced to not more than half the above overshoot tolerance.

Furthermore, since an upper-limit value is set, the amount of air extracted from the air compressor 5c to the coal gasifier 3 also decreases. Thus, the compressed air that is supplied from the air compressor 5c to the combustor 5a of the gas turbine 5b does not decrease. Accordingly, it becomes possible to maintain the output of the gas turbine 5b without increasing the load of the air compressor 5c.

The upper-limit value must be set such that the air ratio does not decrease too much. Specifically, the upper-limit value is set to be such a value that coal combustion makes it possible to dissolve ash components in the coal gasifier 3 and to attain an appropriate internal pressure of the coal gasifier 3.

Furthermore, the upper-limit value may be changed in accordance with the magnitude of variation in the operating-state quantity of the coal gasifier 3 or the magnitude of variation in the load of the IGCC plant 1. For example, in the case where the variation is greater, the upper-limit value is made smaller. By making the upper-limit value smaller, the air-ratio decreases, and the amount of generated combustible gas in the synthesis gas becomes larger, so that the IGCC plant 1 can be stabilized more quickly.

Figure 6:
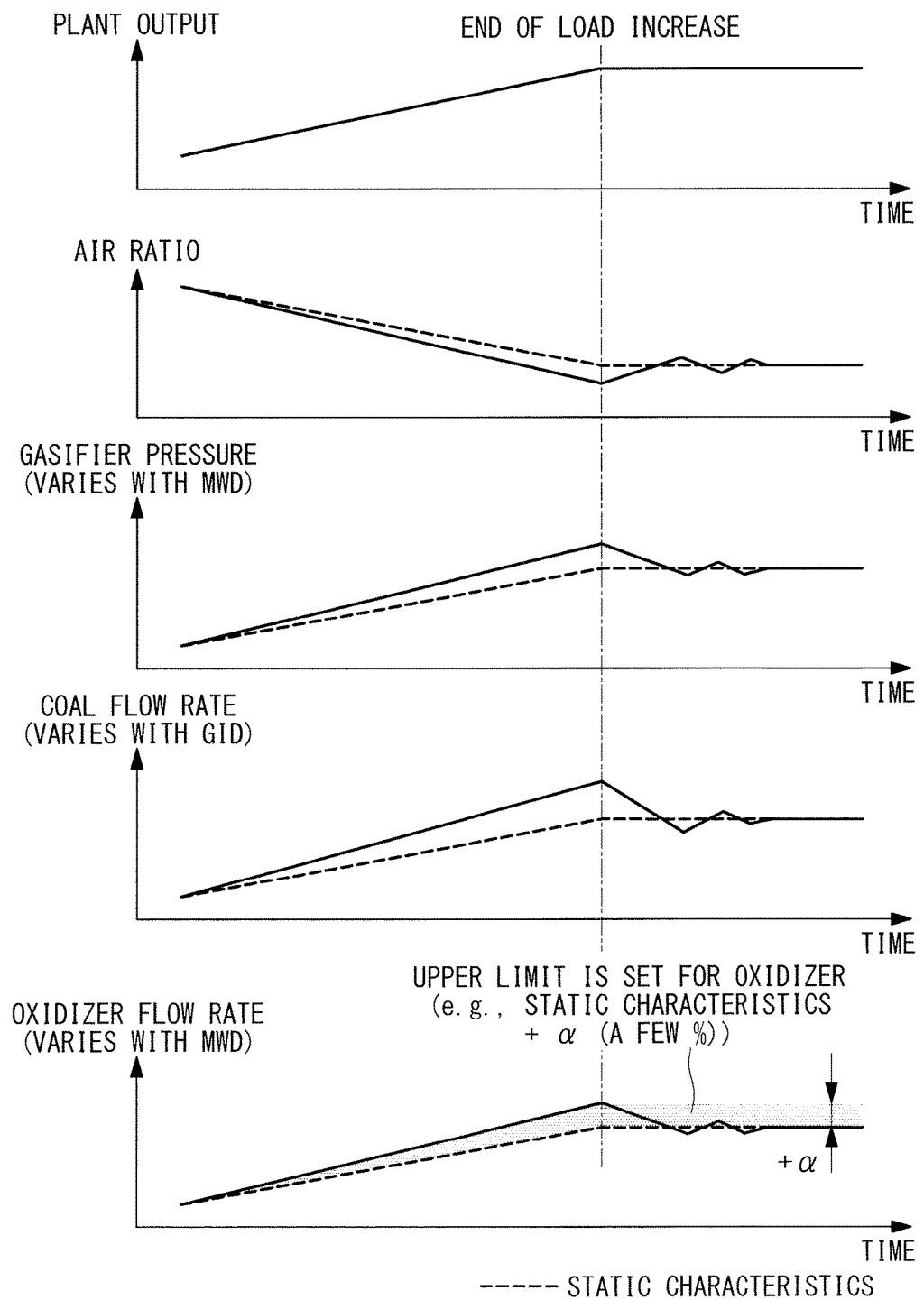
FIG. 6 is a graph showing temporal changes in various state quantities corresponding to variations in a load of the IGCC plant according to the first embodiment.

FIG. 6 is a graph showing temporal changes in various state quantities corresponding to variations in the load of the IGCC plant 1 according to the first embodiment.

As shown in FIG. 6, in the case where the load of the IGCC plant 1 is increased, the coal flow rate and the oxidizer flow rate are increased so as to satisfy the requested load according to preceding signals.

Also in this case, the oxidizer flow rate is controlled to be less than or equal to a predetermined upper-limit value while allowing deviation of the air ratio from a predetermined set value.

Thus, as the amount of generated combustible gas in the synthesis gas becomes larger, the gasifier pressure rises more rapidly, so that the IGCC plant 1 is stabilized more quickly.

As described above, the IGCC plant 1 according to the first embodiment includes the coal gasifier 3 that gasifies coal by using an oxidizer and the gas turbine 5b that is driven by combustion gas generated by combustion of fuel gas obtained by purifying the gas generated by the coal gasifier 3 in the gas clean-up equipment 22. The control unit 50 of the IGCC plant 1 controls the amount of oxidizer that is supplied to the coal gasifier 3 to be less than or equal to a predetermined upper-limit value, while allowing deviation of the air ratio from a predetermined set value, in accordance with variations in the operating-state quantity of the coal gasifier 3 or variations in the load of the IGCC plant 1.

Accordingly, the capacity of the oxidizer supplying equipment need not be increased in the IGCC plant 1 according to the first embodiment, and it is possible to quickly stabilize the control of the IGCC plant 1 as a whole.

Second Embodiment

Now, a second embodiment of the present invention will be described.

The configuration of the IGCC plant 1 according to the second embodiment is the same as the configuration of the IGCC plant 1 according to the first embodiment shown in FIG. 1, so that a description thereof will be omitted.

Even in the case where the operating-state quantity of the coal gasifier 3 varies or in the case where the load of the IGCC plant 1 varies, in the related art, it has been the case to exercise control in the fixed-air-ratio mode, in which the air ratio is fixed, just like the case where the IGCC plant 1 is in a stable state. The control in which the air ratio is fixed is, in other words, control in which the air ratio is maintained constant. However, due to the fixed air ratio, there have been cases where an overshoot occurs in another control amount (e.g., the oxidizer flow rate) of the coal gasifier 3, so that it takes time to stabilize control of the IGCC plant 1 as a whole.

Thus, in the second embodiment, in the case where the operating-state quantity of the coal gasifier 3 varies or the case where the load of the IGCC plant 1 varies, the operation mode is switched from the fixed-air-ratio mode to the variable-air-ratio mode, in which the air ratio is variable.

In the case where the operating-state quantity of the coal gasifier 3 varies or the case where the load of the IGCC plant 1 varies, the operation mode is switched to the variable-air-ratio mode, so that the oxidizer flow rate varies in accordance with the load, whereby overshooting of the oxidizer flow rate is suppressed. Furthermore, since overshooting of the oxidizer flow rate is suppressed, the oxidizer flow rate relative to the amount of carbon-containing fuel that is supplied to the coal gasifier 3 decreases. Thus, the amount of generated combustible gas (e.g., CO) in the synthesis gas in the coal gasifier 3 increases. Accordingly, the heating value of the synthesis gas increases more rapidly compared with the related art, so that the IGCC plant 1 is stabilized in a shorter time.

Furthermore, since overshooting of the oxidizer flow rate is suppressed, overshoot tolerance that is allowed in relation to the capacity of the air booster 17, which is equipment for supplying an oxidizer, becomes smaller, so that the capacity of the air booster 17 can be made smaller compared with the related art. Furthermore, as the overshoot tolerance becomes smaller, the deviation of the equipment design point from the operating point for normal operation of the air booster 17 is suppressed.

Thus, the capacity of the air booster 17 need not be increased in the IGCC plant 1 according to the second embodiment, and it is possible to quickly stabilize control of the plant as a whole.

Here, the cause of the variation in the operating-state quantity of the coal gasifier 3, i.e., the cause of the occurrence of hunting in the power generation output of the IGCC plant 1, is as follows.

Figure 7:
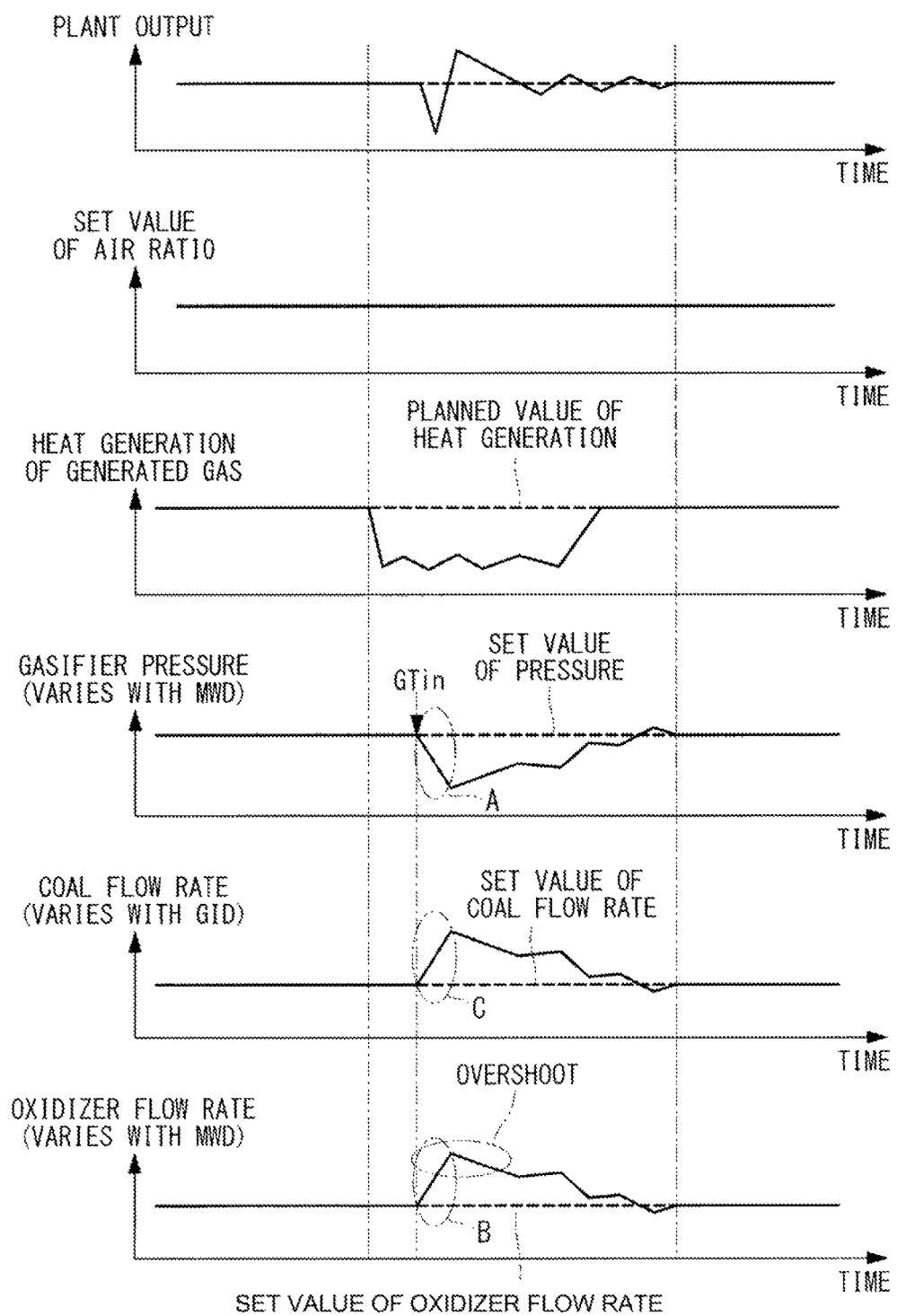
FIG. 7 is a graph showing temporal changes in various state quantities corresponding to variations in an operating-state quantity of a coal gasifier according to a second embodiment.

When the amount of fuel that is supplied to the gas turbine 5b increases, the deviation of the actual gasifier pressure (measured value) from the gasifier-pressure set value increases, as indicated in region A of temporal changes in the gasifier pressure shown in FIG. 7. In accordance with this increase, as indicated in region B of temporal changes in the oxidizer flow rate shown in FIG. 7, the amount of air extracted from the air compressor 5c to the gas turbine 5b increases, so that the power generation output of the IGCC plant 1 decreases.

That is, the cause of variation in the operating-state quantity of the coal gasifier 3 is presumably the large deviation of the gasifier-pressure measured value from the gasifier-pressure set value. In the case where the IGCC plant 1 is stable, the deviation from the gasifier-pressure set value is zero or small.

Thus, in the second embodiment, it is determined that the load of the IGCC plant 1 has varied in the case where the deviation of the gasifier-pressure measured value from the gasifier-pressure set value has become greater compared with that in a stable state. This makes it possible to readily determine whether the load of the gasifier power generation plant has varied.

Figure 8:
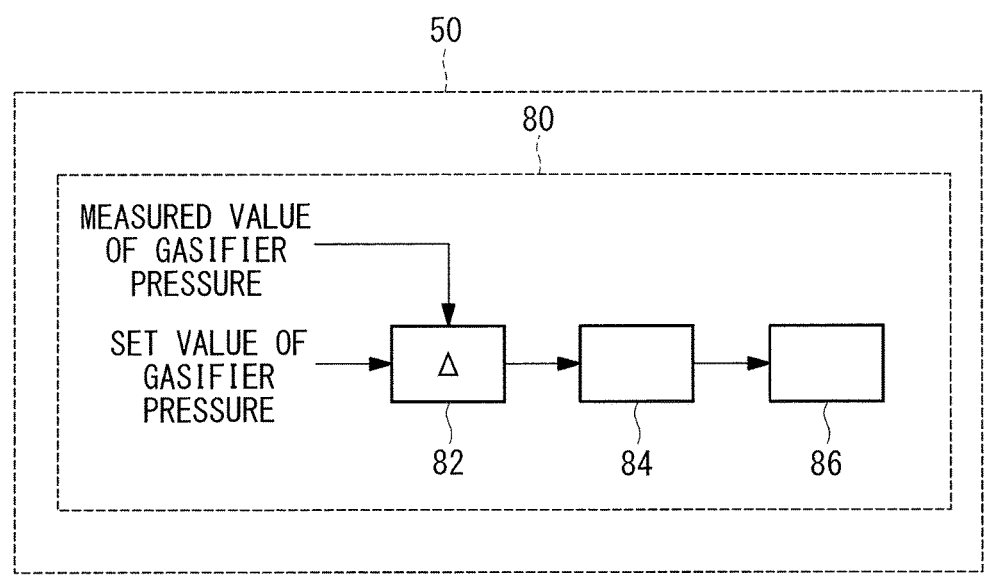
FIG. 8 is a functional block diagram showing the configuration of a control unit according to the second embodiment.
Figure 9:
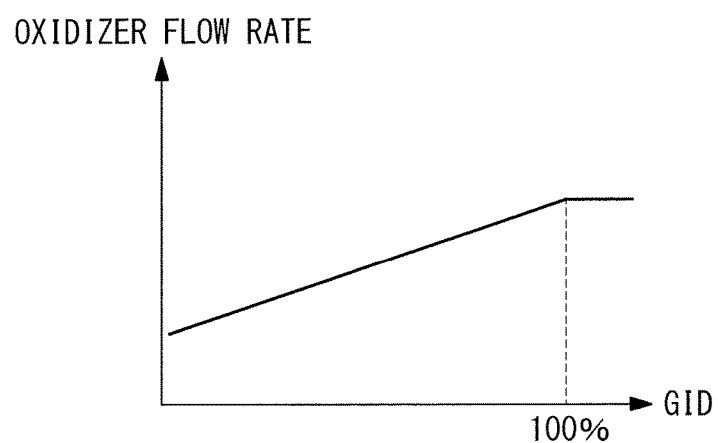
FIG. 9 is a graph showing the relationship between an oxidizer flow rate and a GID in the related art.
Figure 10:
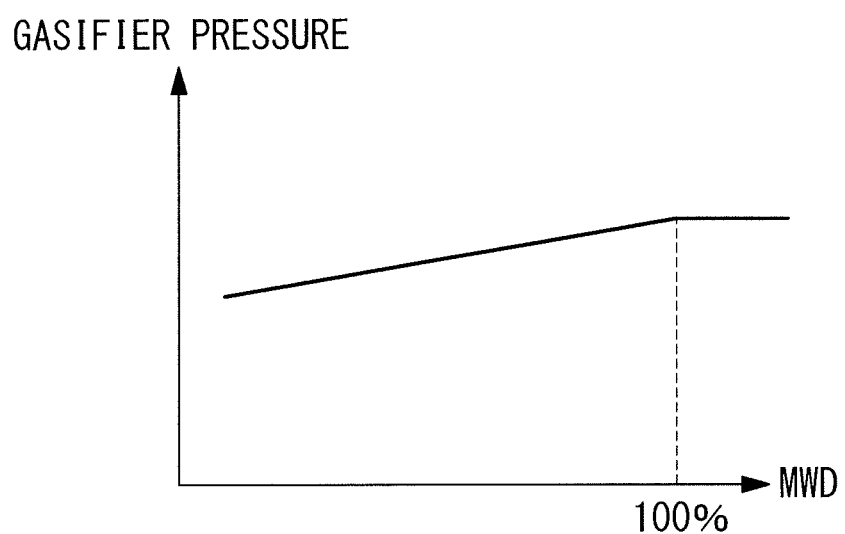
FIG. 10 is a graph showing the relationship between a gasifier pressure and an MWD in the related art.
Figure 11:
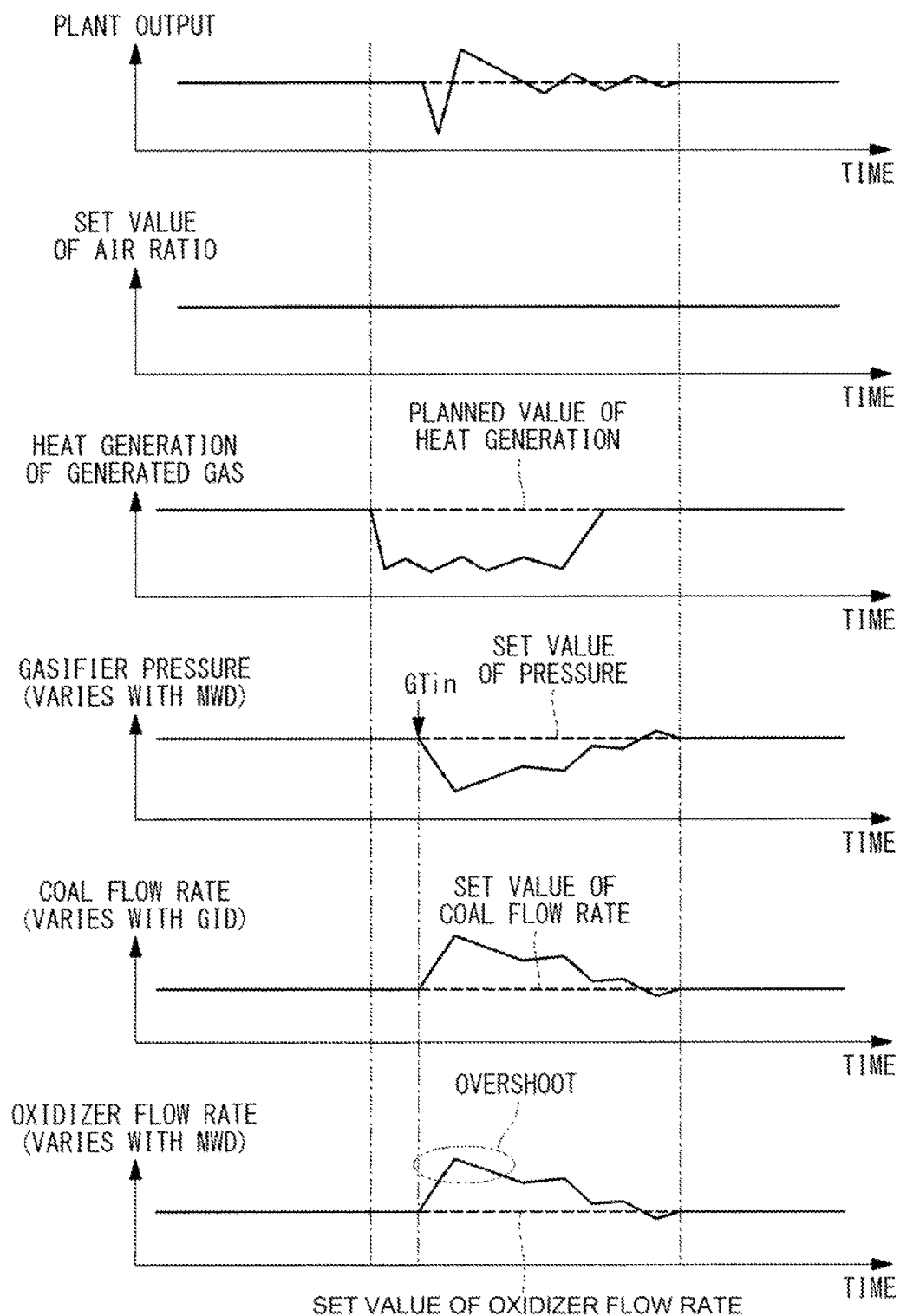
FIG. 11 is a graph showing temporal changes in various state quantities in a case where an operating-state quantity of a coal gasifier has varied in the related art.

FIG. 8 is a functional block diagram showing the configuration of the control unit 50 according to the second embodiment.

The control unit 50 according to the second embodiment includes an operation-mode switching unit 80.

The operation-mode switching unit 80 includes a deviation calculating unit 82, a hunting determining unit 84, and an operation-mode setting unit 86.

The deviation calculating unit 82 calculates a deviation of a measured value from a set value of the gasifier pressure (hereinafter referred to as a "pressure deviation").

The hunting determining unit 84 determines whether the load of the IGCC plant 1 has varied based on a time derivative of the pressure deviation.

The operation-mode setting unit 86 sets the operation mode of the IGCC plant 1 to either the fixed-air-ratio mode or the variable-air-ratio mode.

The pressure deviation calculated by the deviation calculating unit 82 is input to the hunting determining unit 84.

In the case where the time derivative of the pressure deviation becomes greater than or equal to a predetermined value, the hunting determining unit 84 determines that the disparity between the measured value and the set value of the gasifier pressure does not tend to decrease and that the load of the IGCC plant 1 has varied. The predetermined value is a value determined in advance, which is set in advance based on simulation or actual operation.

In the case where it is determined by the hunting determining unit 84 that the load of the IGCC plant 1 has varied, the operation-mode setting unit 86 sets the operation mode of the IGCC plant 1 to the variable-air-ratio mode. On the other hand, in the case where the time derivative of the pressure deviation is less than the predetermined value, the operation-mode setting unit 86 sets the operation mode of the IGCC plant 1 to the fixed-air-ratio mode.

As another type of the IGCC plant 1, there is a type of plant in which the drive shaft of the steam turbine equipment 7 is not shared with the drive shaft of the gas turbine 5b. In this type of the IGCC plant 1, the case where the load of the IGCC plant 1 has varied is the case where the output of the gas turbine 5b does not increase, whereas the GID increases. When the GID increases, the coal flow rate increases, as indicated in region C of the temporal changes in the coal flow rate shown in FIG. 7.

In the control unit 50 of the IGCC plant 1 configured as described above, the GID and the output value (GTMW) of the gas turbine 5b are input to the deviation calculating unit 82. Then, the hunting determining unit 84 determines whether the load of the IGCC plant 1 has varied based on a time derivative of the ratio of the GID to the GTMW. Then, in the case where it is determined that the load of the IGCC plant 1 has varied, the operation-mode setting unit 86 sets the operation mode of the IGCC plant 1 to the variable-air-ratio mode.

Although the present invention has been described above in the context of the embodiments, the technical scope of the present invention is not limited to the scope described as the embodiments. Various modifications or improvements can be added to the embodiments without departing from the scope of the invention, and configurations involving the additional modifications or improvements are also encompassed in the technical scope of the present invention.

For example, although the above embodiments have been described in the context of a configuration in which the pressure of the air extracted from the air compressor 5c of the gas turbine 5b is boosted by the air booster 17 and the air is then supplied to the coal gasifier 3 as an oxidizer, the present invention is not limited to this configuration, and the configuration may be such that air extracted from the air compressor 5c is supplied to the ASU 15, where the air is used to produce oxygen.

Furthermore, although the above embodiments have been described in the context of a configuration in which the oxidizer flow rate is determined based on an MWD, the present invention is not limited to this configuration, and the configuration may be such that the oxidizer flow rate is determined based on a GID.

Furthermore, although the above embodiments have been described in the context of a configuration in which whether the operating-state quantity of the coal gasifier 3 has varied is determined based on the deviation of a measured value from a set value of the gasifier pressure, the present invention is not limited to this configuration. The configuration may be such that the determination is made based on the deviation of a measured value from a set value of the outlet pressure of the coal gasifier 3, the deviation of a measured value from a set value of the outlet pressure of the gas clean-up equipment 22, or the deviation of a measured value from a set value of the inlet pressure of the gas turbine 5b.

Furthermore, although the above embodiments have been described in the context of a configuration in which the oxidizer flow rate is determined based on the deviation of a measured value from a set value of the gasifier pressure based on an MWD, the present invention is not limited to this configuration. The configuration may be such that the determination is made based on the deviation of a measured value from a set value of the outlet pressure of the coal gasifier 3 based on the MWD, the deviation of a measured value from a set value of the outlet pressure of the gas clean-up equipment 22 based on the MWD, or the deviation of a measured value from a set value of the inlet pressure of the gas turbine 5b based on the MWD.

Furthermore, although the above embodiments have been described in the context of a configuration in which a gasification power generation plant according to this embodiment is the IGCC plant 1 including the steam turbine equipment 7, the present invention is not limited to this configuration. For example, the configuration may be such that the present invention is applied to a gasification power generation plant not including steam turbine equipment.

Furthermore, although the oxidizer flow rate control unit 52 includes the coefficient calculating unit and the coefficient multiplying unit in the above embodiments, the present invention is not limited to this configuration, and the configuration may be such that the oxidizer flow rate control unit 52 includes an amount-of-increase calculating unit and an amount-of-increase adding unit. Here, the amount-of-increase β is an oxidizer flow rate with which the air ratio becomes a predetermined set value. The amount-of-increase calculating unit calculates the amount-of-increase β based on a function including the amount-of-increase β as a variable, a table representing oxidizer flow rates corresponding to pressure deviations, etc.

Furthermore, in the case where the oxidizer flow rate calculated by the amount-of-increase adding unit exceeds the limit value for the set value of the oxidizer flow rate calculated by the coefficient multiplying unit in the above embodiments, a limit value may also be defined for the amount-of-increase β similarly to the coefficient α.

REFERENCE SIGNS LIST

1 IGCC plant
3 Coal gasifier
5b Gas turbine
7 Steam turbine equipment
8 Oxidizer supply path
22 Gas clean-up equipment
50 Control unit
52 Oxidizer flow rate control unit
80 Operation-mode switching unit

The invention claimed is:

1. A control unit for a gasification power generation plant including a gasifier that gasifies carbon-containing fuel by using an oxidizer, a gas turbine that is driven by combustion gas generated by combustion of fuel gas obtained by purifying synthesis gas from the gasifier in gas clean-up equipment, and an oxidizer supply path for supplying air extracted from an air compressor of the gas turbine or oxygen separated from the air as an oxidizer for the gasifier,
the control unit for the gasification power generation plant comprising a switching unit for choosing a fixed-air-ratio mode, in which an air ratio representing the ratio of the amount of the oxidizer that is supplied to the gasifier relative to a theoretical amount of the oxidizer for combustion of the carbon-containing fuel is fixed, in a case where the gasification power generation plant is in a stable state, whereas choosing a variable-air-ratio mode, in which the air ratio is variable by varying an oxidizer amount in accordance with a load of the gasification power generation plant so that the air ratio is decreased, in a case where an operating-state quantity of the gasifier has varied or in a case where the load of the gasification power generation plant has varied.

2. A control unit for the gasification power generation plant according to claim 1, wherein the case where the operating-state quantity of the gasifier varies is a case where the deviation of a measured value of the pressure of the gasifier from a set value of pressure of the gasifier becomes greater compared with that in the stable state.

3. A control unit for the gasification power generation plant according to claim 1,
wherein the gasification power generation plant includes a steam turbine that is driven by steam generated by heat recovery from the gasifier and the gas turbine exhaust gas and that does not share a drive shaft with the gas turbine, and
wherein the case where the operating-state quantity of the gasifier varies is a case where the output of the gas turbine does not increase, whereas a gasifier input demand increases, the gasifier input demand being a parameter dictating heat input to the gasifier.

4. A control unit for a gasification power generation plant including a gasifier that gasifies carbon-containing fuel by using an oxidizer, a gas turbine that is driven by combustion gas generated by combustion of fuel gas obtained by purifying synthesis gas from the gasifier in gas clean-up equipment, and an oxidizer supply path for supplying air extracted from an air compressor of the gas turbine or oxygen separated from the air as an oxidizer for the gasifier,
the control unit for the gasification power generation plant comprising an oxidizer-amount controlling unit for controlling the amount of the oxidizer that is supplied to the gasifier to be less than or equal to a predetermined upper-limit value, while allowing decrease of an air ratio from a predetermined set value so that an oxidizer amount is varied in accordance with a load of the gasification power generation plant, the air ratio representing the ratio of the amount of the oxidizer that is supplied to the gasifier relative to a theoretical amount of the oxidizer for combustion of the carbon-containing fuel, in accordance with variations in an operating-state quantity of the gasifier or variations in the load of the gasification power generation plant.

5. A control unit for the gasification power generation plant according to claim 4, wherein the oxidizer amount is determined based on the deviation of a measured value of the pressure of the gasifier from a set value of the pressure of the gasifier based on an output demand value to the gasification power generation plant.

6. A control unit for the gasification power generation plant according to claim 5, wherein the oxidizer amount determined based on the output demand value is corrected by using a gasifier input demand, which is a parameter dictating heat input to the gasifier.

7. A control unit for the gasification power generation plant according to claim 4, wherein the oxidizer-amount controlling unit controls the oxidizer amount to be less than or equal to the upper-limit value only in a case where the pressure of the gasifier is increased.

8. A gasification power generation plant comprising:
a gasifier that gasifies carbon-containing fuel by using an oxidizer;
a gas turbine that is driven by combustion gas generated by combustion of fuel gas obtained by purifying synthesis gas from the gasifier in gas clean-up equipment; and
a control unit according to claim 1.

9. A control method for a gasification power generation plant including a gasifier that gasifies carbon-containing fuel by using an oxidizer, a gas turbine that is driven by combustion gas generated by combustion of fuel gas obtained by purifying synthesis gas from the gasifier in gas clean-up equipment, and an oxidizer supply path for supplying air extracted from an air compressor of the gas turbine or oxygen separated from the air as an oxidizer for the gasifier,
> wherein a fixed-air-ratio mode, in which an air ratio representing the ratio of the amount of the oxidizer that is supplied to the gasifier relative to a theoretical amount of the oxidizer for combustion of the carbon-containing fuel is fixed, is chosen in a case where the gasification power generation plant is in a stable state, whereas a variable-air-ratio mode, in which the air ratio is variable by varying an oxidizer amount in accordance with a load of the gasification power generation plant so that the air ratio is decreased, is chosen in a case where an operating-state quantity of the gasifier has varied or in a case where the load of the gasification power generation plant has varied.

10. A control method for a gasification power generation plant including a gasifier that gasifies carbon-containing fuel by using an oxidizer, a gas turbine that is driven by combustion gas generated by combustion of fuel gas obtained by purifying synthesis gas from the gasifier in gas clean-up equipment, and an oxidizer supply path for supplying air extracted from an air compressor of the gas turbine or oxygen separated from the air as an oxidizer for the gasifier,
> wherein the amount of the oxidizer that is supplied to the gasifier is controlled to be less than or equal to a predetermined upper-limit value, while allowing decrease of an air ratio from a predetermined set value so that an oxidizer amount is varied in accordance with a load of the gasification power generation plant, the air ratio representing the ratio of the amount of the oxidizer that is supplied to the gasifier relative to a theoretical amount of the oxidizer for combustion of the carbon-containing fuel, in accordance with variations in an operating-state quantity of the gasifier or variations in the load of the gasification power generation plant.

* * * * *